Figure 2:
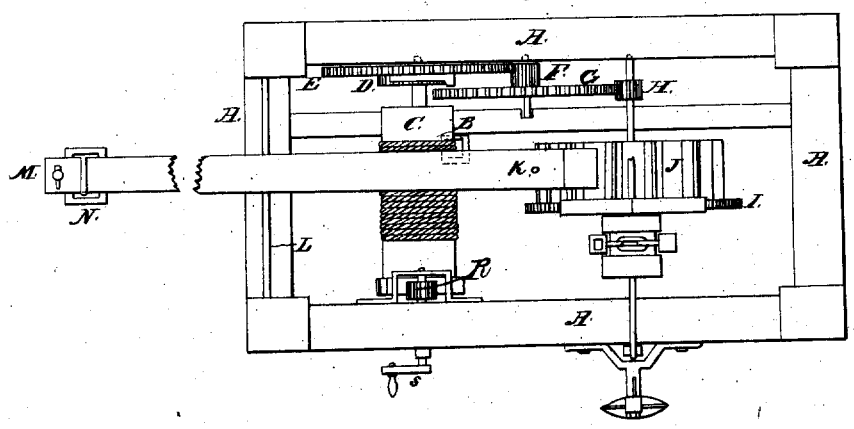

9830X

D. Hess,

Windlass Water Elevator,

Patented July 1, 1836.

N. PETERS, PHOTO-LITHOGRAPHER, WASHINGTON, D. C.

9830X

July 1, 1836

David Hess of Shepherdstown Virginia

Letters Patent.

The Schedule referred to in these Letters Patent and making part of the same con-
taining a description in the words of the said David Hess himself of his "improve-
ment in the machinery applicable to the raising of Water by means of a weight."

To all to whom these presents shall come. Be it Known that I David Hess
of Shepherdstown in the County of Jefferson and State of Virginia have in-
vented a new and useful improvement in the machinery applicable to the raising
water by means of a weight acting by an arrangement of wheels upon a lever, con-
nected with the Pump Rod or upon a chain belt and elevator." and that the fol-
lowing is a full and exact description of the manner in which the same is to be
carried into effect as being fully described and ascertained in and by the follow-
ing description thereof reference being had to the drawing hereunto annexed by
the letters marked thereon. My invention consists in combining several
well Known parts in such a manner as to produce an arrangement of machine-
ry applicable to [illegible] raising water by the operation of a weight either with or without
a pendulum being attached. also in constructing a balanced lever to work in
a toothed wheel so as to dispense with said pendulum when desired.

Figure 1:
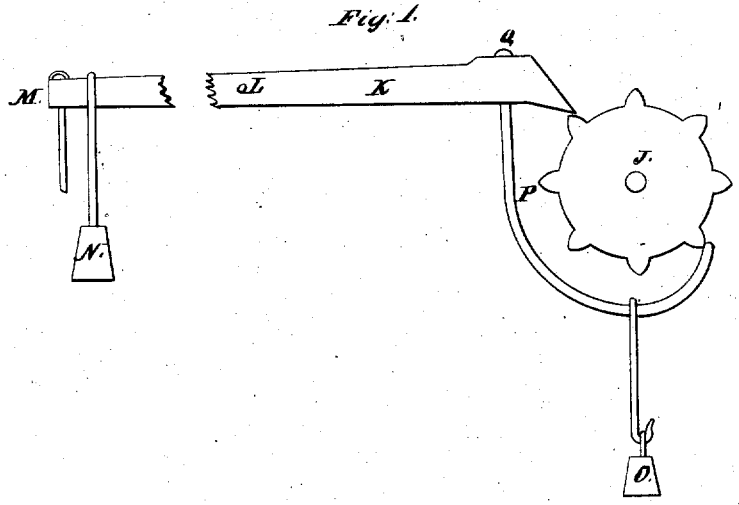

Description of the drawing. that is to say. Fig 1. is a side view of the
machinery arranged according to the invention. Fig 2. is a plan in
both of which figures as well as in several others as sections the same refer-
letters of reference indicate the several parts. A. the frame work B. the rope
or chain to which the weight is attached and which is wound round the
[illegible] barrel C. which is furnished with the hand and ratchet wheel D.
to connect it while the weight is exerting its force with the tooth wheel E.
in the ordinary way. The pinion F is driven by the main wheel E and
has fast upon its axis the toothed wheel G. which works into the pinion
H. made fast upon its axis. Though I do propose in some cases to
dispense with the wheel or pinion G & F and place the pinion H to be
driven by the main wheel E. On the same axle as the pinion H is pla-
ced the escapement wheel I. for the purpose of connecting the pendulum
verge and escapement in the ordinary way of clock work. when [illegible]

[illegible] use that mode of regulating the motion of the pinion H & wheels. But I have
contrived another method which I prefer as being more simple and advan-
tageous. thus. by the side of the escapement wheel I. is to be placed the
toothed wheel J. having the cogs brought to a sharp edge. and on the
top of it is placed the horizontal lever K turning on its axis L in the
frame work. at the extreme end of this lever beyond the frame work
and where the piston or pump rod M. is to be attached for raising the water
by an ordinary Pump. I place the weight N. and at the other end which
is to play over the escapement wheel I also place the weight O. so as
to adjust or place in equilibrium the lever on each side of its axis.
This weight is supported by a hook upon the bent or curved wire P at the
lower part thereof. this curved wire rod is secured to the lever at Q at
one end having the other sufficiently extended to embrace the escapement wh.
and touch it at a point opposite to the end of the lever which touches on
the same wheel. the end of the wire is here bent up so much as to exactly
adjust it to check by its rise against a bottom tooth. the motion allow-
ed by the escape from the lever head of the top tooth on the opposite side
and thus alternately regulates the motion of the pinion H. in the same de-
gree as will the ordinary escapement verge & pendulum as already
mentioned and this mode I prefer. The barrel when all the rope is un-
coiled may be wound up again by the application of the pinion R. by
the crank S. which will be displaced when not in use. I also purpose
to adapt a chain belt and elevators T. to the axis of the escapement wheel
I. by means of a pulley thereon and one beneath the surface of the water
should that mode be preferred to raising by the ordinary pump. The size
of the wheel and the number of cogs thereon I do not confine myself to as
they will evidently be subject to variation according to the speed or pow.
er desired. I would also say that the escapement wheel and pinion H.
may be secured upon an axis together without the wheel J. in which case
when the pendulum motion is wanted the axle and wheel J will be remo-
ved and the one with the escapement substituted for it. I would be under-
stood not to claim any of the various parts used separately but I
do claim as my invention the manner in which I construct 9830x July 1, 1836 adapted the lever K smoothing wheel d. so as to regulate the motion of the pinion H.

Witnesses
Henry Hone
S H Morrell

David Reed.

924 words)

Drawing